US005522293A

United States Patent [19]

Ingram

[11] Patent Number: 5,522,293

[45] Date of Patent: Jun. 4, 1996

[54] METHOD AND APPARATUS FOR ACCURATELY POSITIONING A KNIFE BLADE FOR SCORING PLASTIC TAMPER INDICATING CLOSURES

[75] Inventor: Keith W. Ingram, Holland, Ohio

[73] Assignee: Owens-Illinois Closure Inc., Toledo, Ohio

[21] Appl. No.: 135,830

[22] Filed: Oct. 14, 1993

[51] Int. Cl.$^{6}$ .............................. B27G 23/00; B23Q 3/18; B23Q 16/00

[52] U.S. Cl. ......................... 83/54; 83/522.14; 83/522.25; 82/47; 33/633

[58] Field of Search ................................ 82/47, 100, 152, 82/153, 156, 173; 83/54, 522.14, 522.25, 522.16, 581.1, 879–881, 883, 954; 81/484; 33/632–639, 637; 29/464

[56] References Cited

U.S. PATENT DOCUMENTS

| | | | |
|---|---|---|---|
| 3,600,816 | 8/1971 | Watanabe | 33/634 |
| 3,867,763 | 2/1975 | Wilkins | 33/185 R |
| 3,988,953 | 11/1976 | Bosey et al. | 83/2 |
| 4,014,228 | 3/1977 | Dean | 82/47 |
| 4,322,009 | 3/1982 | Mumford | 215/253 |
| 4,538,489 | 9/1985 | Takano | 82/71 |
| 4,545,496 | 10/1985 | Wilde et al. | 215/252 |
| 4,613,052 | 9/1986 | Gregory et al. | 215/252 |
| 4,721,218 | 1/1988 | Gregory et al. | 215/252 |
| 4,801,031 | 1/1989 | Barriac | 215/252 |
| 5,090,788 | 2/1992 | Ingram et al. | 215/252 |

*Primary Examiner*—Maurina T. Rachuba
*Assistant Examiner*—Kenneth J. Hansen

[57] ABSTRACT

A method and apparatus for scoring plastic tamper indicating closures to provide the tamper indicating band that is connected to the closure by bridges formed by scoring. The scoring is achieved by successively moving a rotating closure past a stationary primary knife blade having an arcuate concave interrupted cutting edge to form the bridges and then past a secondary knife blade having an arcuate concave uninterrupted cutting edge to accurately dimension the bridges. The method and apparatus provides for supporting each knife blade on a holder wherein the position of the blade can be set by setting the blade into a knife blade holder using a setting fixture remote from the apparatus, clamping the blade within the knife blade holder, transferring the knife holder to a machine mounting on the apparatus, then attaching the knife holder to the machine mounting without further adjustment, such that the arcuate knife blade is aligned with the center of the radius of the arc of each arcuate knife blade lies on a radial line from the curvature of the cutting edge to the center of the apparatus Each knife blade holder is preferably mounted on a slide on the rotary apparatus such that the arcuate edge can be adjusted so that the concave arc is parallel to the path of travel of the mandrels and at the required depth from the successive scoring.

9 Claims, 6 Drawing Sheets

METHOD AND APPARATUS FOR ACCURATELY POSITIONING A KNIFE BLADE FOR SCORING PLASTIC TAMPER INDICATING CLOSURES

This invention relates to making tamper indicating closures and particularly to a method and apparatus for making tamper indicating plastic closures which have a base wall and a peripheral skirt that is scored to define a tamper indicating band on the closure connected to the peripheral skirt by a plurality of bridges. The bridges are broken when the closure is removed from a container.

BACKGROUND AND SUMMARY OF THE INVENTION

One type of tamper indicating closure, includes molded circumferentially spaced bridges in order to define a tamper indicating band on the closure. Such construction requires costly more complex molds which also require maintenance. Typical patents showing such tamper indicating closures comprise U.S. Pat. Nos. 4,613,052, 4,721,218, 4,801,031, 5,090,246 and 5,090,788.

Another type of tamper indicating closure comprises utilizing an interrupted edged knife to produce bridges such as shown in U.S. Pat. No. 4,322,009.

In another type of tamper indicating closure, circumferentially spaced axial bridges are provided on the internal surface of the skirt of the closure and a continuous straight edged knife is applied from the exterior surface cutting through the wall of the closure and into the bridges. Such a construction also requires costly complex molds that require maintenance and necessitates relatively thin walls on the closures. A typical patent showing such a construction comprises U.S. Pat. No. 4,545,496.

In United States application Ser. No. 08/048,638 filed Apr. 19, 1993, having a common assignee with the present application, a tamper indicating closure is shown which comprises a base wall and a peripheral skirt having an internal thread adapted to engage the threads of a container wherein a tamper indicating band is provided on the skirt by a plurality of circumferentially spaced bridges. The band includes portions adapted to engage an annular bead on the container. The bridges are formed by using a primary knife having an interrupted cutting edge to produce a circumferential score in the side wall of the closure leaving spaced connectors or bridges. A secondary knife is used having a continuous uninterrupted cutting edge to provide a continuous external score line to provide an accurately dimensional radial thickness of the bridges. In a preferred method and apparatus, the closures engage the successive primary and secondary knives and are moved such that the closures roll relative to the knives.

In such apparatus, each arcuate knife is mounted directly onto the apparatus, and its radial position and concentricity are set while the knife is mounted on the apparatus, using adjusting micrometer screws, one at each end of the arcuate blade. Such an apparatus has the disadvantage of loss of machine productive time while the operator is setting blades. It is also difficult to maintain knife concentricity with the center of rotation of the apparatus. This requires operator skill in setting of the Knives, and effective maintenance of the arcuate setting.

Among the objectives of the present invention are to provide a method and apparatus utilizing successive arcuate cutting knives wherein each knife blade is accurately set utilizing a remote setting fixture; wherein the setting fixture does not require the use of a dial indicator and, therefore, is not affected by the variability of the dial indicator setting and needs less skill in use; wherein the setting fixture cannot be over adjusted; and wherein the adjustment is less dependent on operator skill.

In accordance with the invention, a method and apparatus for scoring plastic tamper indicating closures to provide the tamper indicating band that is connected to the closure by bridges formed by scoring. The scoring is achieved by successively moving a rotating closure on rotating mandrel past a stationary primary knife blade having an arcuate concave interrupted cutting edge to form the bridges and then past a secondary knife blade having an arcuate concave uninterrupted cutting edge to accurately dimension the bridges. The method and apparatus provides for supporting each knife blade on a holder wherein the position of the blade can be set by setting the blade into a knife blade holder using a setting fixture remote from the apparatus, clamping the blade within the knife blade holder, transferring the holder to a machine mounting on the apparatus, then attaching the holder to the machine mounting without further adjustment, such that the arcuate knife blade is aligned such that the center of the radius of the arc of each arcuate knife blade is substantially coincident with the center of the apparatus. Each knife blade holder is preferably mounted on a slide on the rotary apparatus such that the arcuate edge can be finely adjusted so that the concave arc is parallel to the path of travel of the mandrels and at the required depth for the successive scoring.

The method and apparatus includes:

1. Remote setting of an arcuate knife blade using an adjustment knob with a built in torque limiter, to drive a cam which in turn moves a blade to a predetermined position against a fixed stop, with a controlled force.
2. The provision of a machine slide having a mounting suitable for the knife blade such that the linear movement of the slide is radial to the center of rotation of a turret apparatus, clamping of an arcuate knife blade with a holder while the knife blade is securely held in a preset position, such that when transferred to the machine mounting, the arcuate knife blade will be aligned such that both the center of the radius of the arc of the arcuate knife blade and the midpoint of the arc lie on a radial line from the center of the turret apparatus parallel to the linear adjustment of said slide.
3. Linear adjustment means by a micrometer screw on the machine, and position indication by digital indicator to enable minor changes in the depth of radial cut of the blade on the machine.

DESCRIPTION

Figure 1:
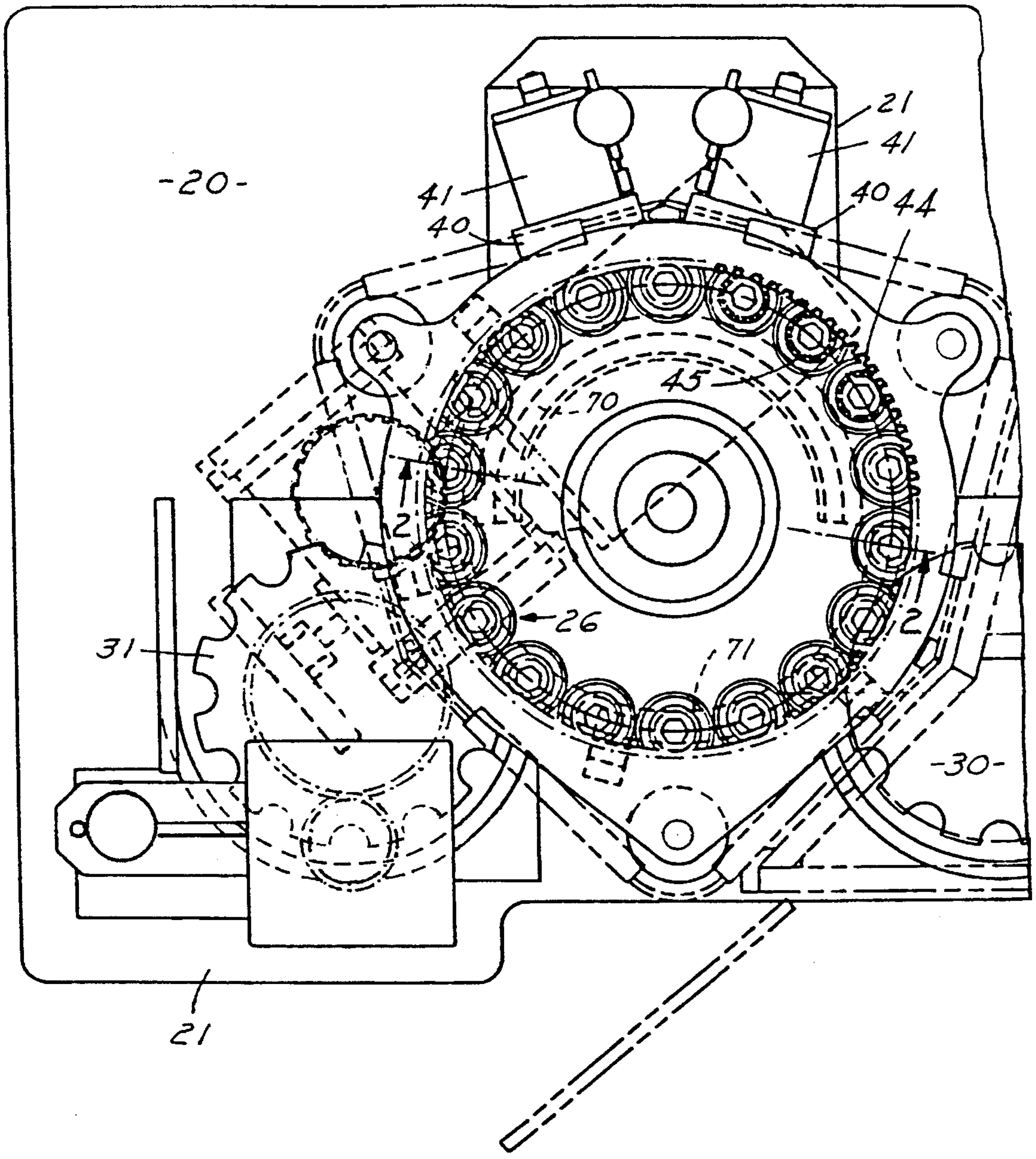
FIG. 1 is a fragmentary plan view of a rotary scoring apparatus embodying the invention.
Figure 2:
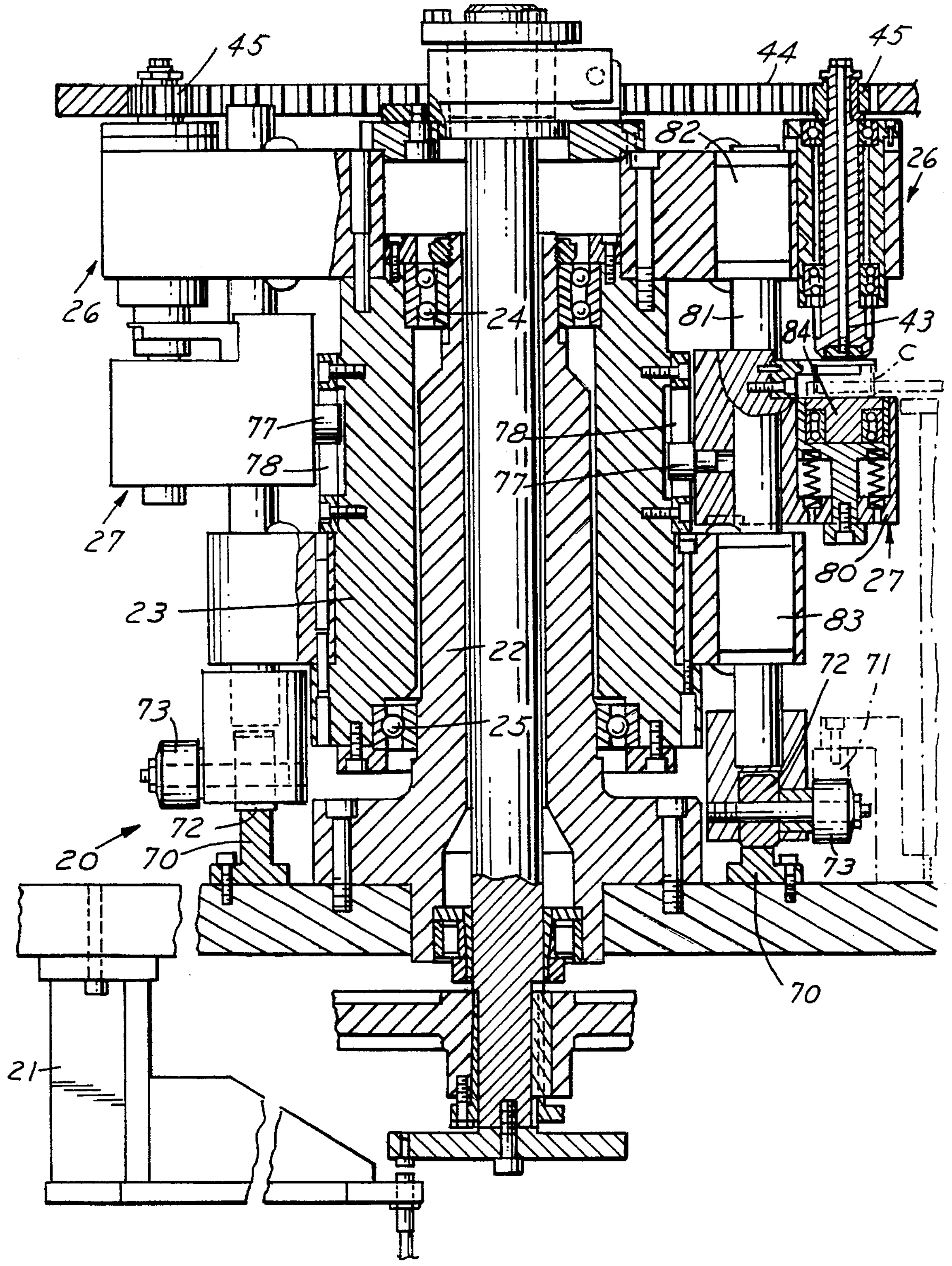
FIG. 2 is a sectional view taken along the line 2—2 in FIG. 1, parts being broken away.
Figure 4:
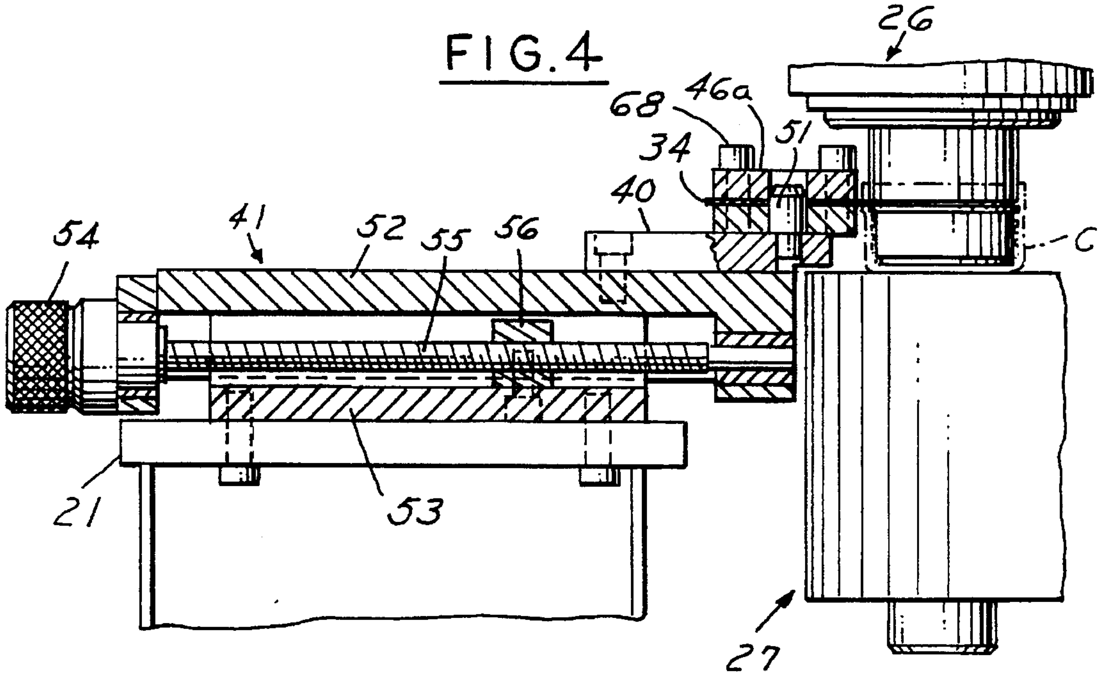
FIG. 4 is a fragmentary part sectional elevational view of a portion of the apparatus taken along the line 4—4 in FIG. 3.
Figure 5:
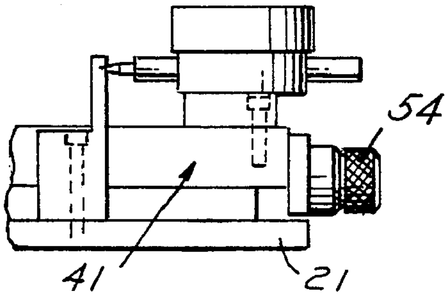
FIG. 5 is a fragmentary elevational view taken along the line 5—5 in FIG. 3.
Figure 7:
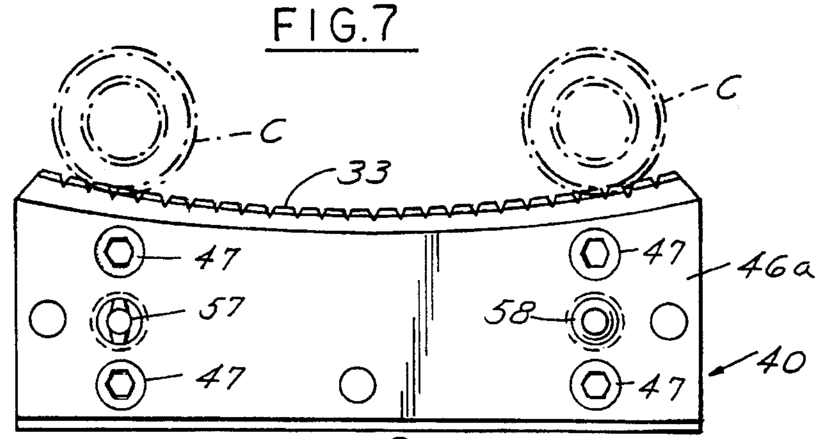
FIG. 7 is a partly diagrammatic plan view showing one of the knife blades having an interrupted cutting edge mounted on the apparatus.
Figure 8:
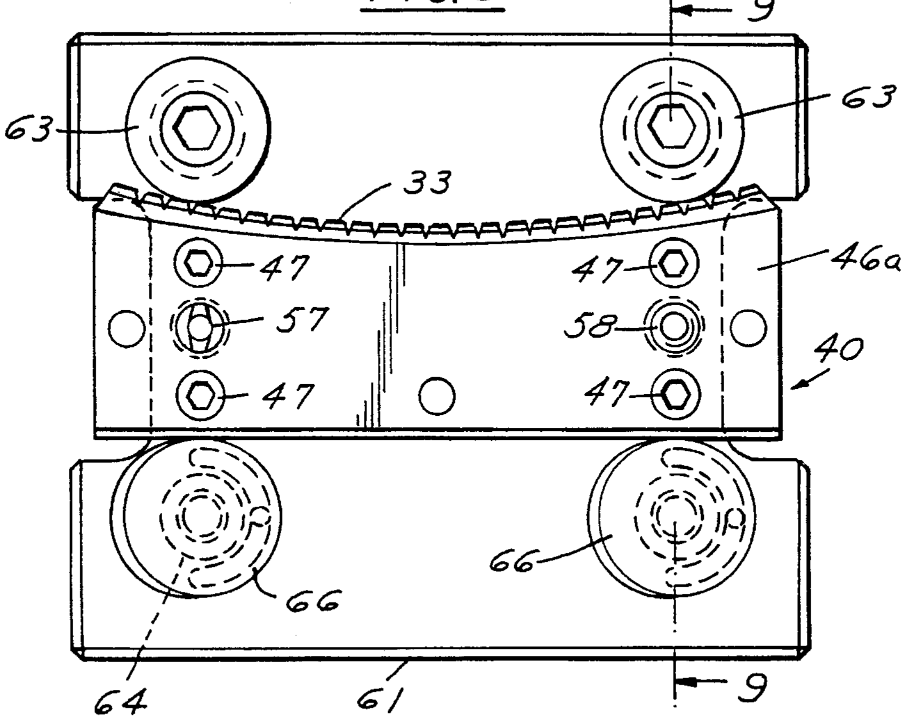
FIG. 8 is a plan view of a setting fixture with the knife blade shown in FIG. 7 mounted thereon.

Referring to FIGS. 1, 2 and 4, the method and apparatus embodying the invention includes a rotary scoring machine or apparatus 20 that has a base 21. A column 22 is mounted on the base 21 and a turret 23 is mounted for rotation on the column 22 by spaced bearings 24, 25. The turret 23 supports a plurality of sets of tooling including an upper tooling 26 and a lower tooling 27. The upper tooling 26 functions to hold a closure C in position on the lower tooling 27 so that it can be moved and rotated past successive arcuate knife blades, as presently described. Closures C are made of plastic, such as polypropylene, by injection molding or compression molding and comprise a base wall and peripheral skirt. The tamper indicating function is provided by a score line and is preferably of the type shown in U.S. Pat. No. 5,090,788, incorporated herein by reference.

Figure 3:
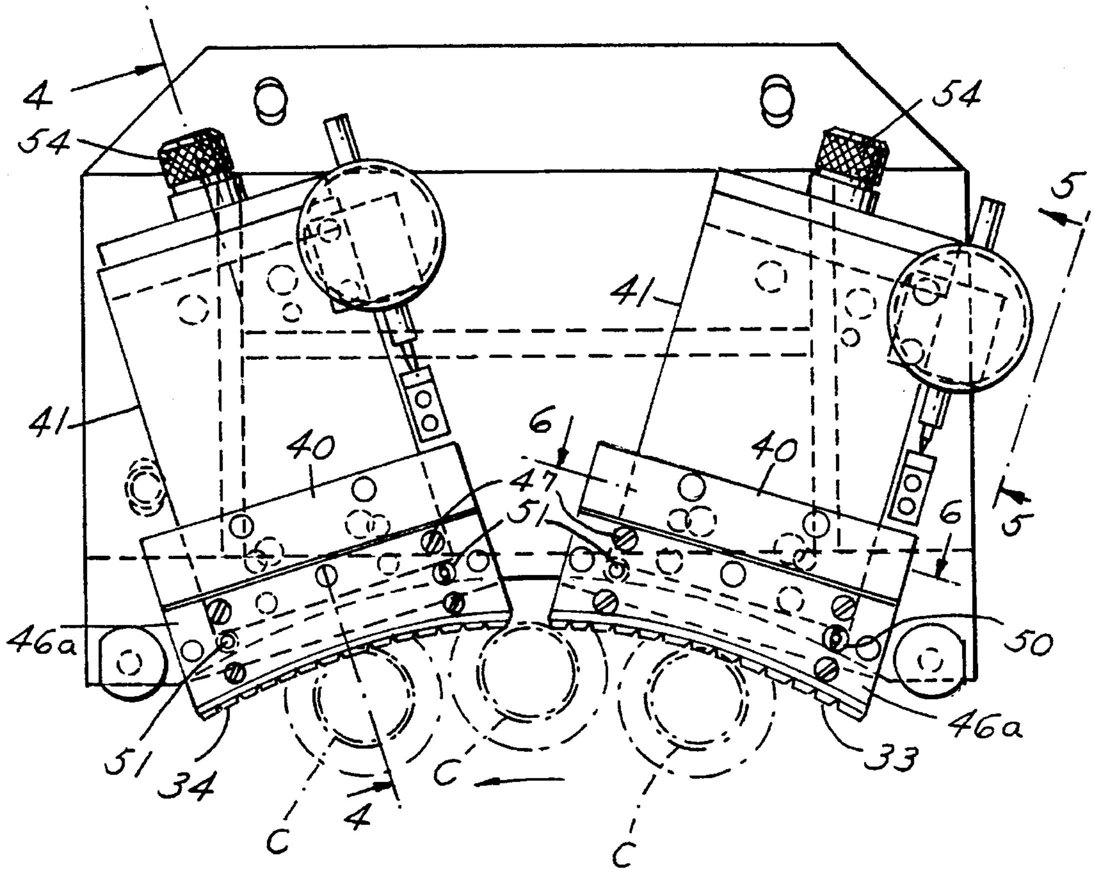
FIG. 3 is a fragmentary partly diagrammatic plan view of a portion of the apparatus shown in FIG. 1.
Figure 6:
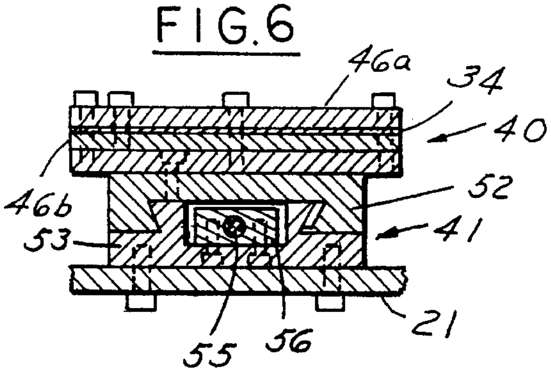
FIG. 6 is a fragmentary sectional view taken along the line 6—6 in FIG. 3.

Closures C are moved successively into the turret 23 and onto support pads of the lower tooling by a starwheel 30. After the closures C are scored, they are removed from the turret by a starwheel 31 (FIG. 1). Referring to FIG. 3, each closure C includes a base wall and a peripheral skirt and is moved past successive cutting knife blades 33, 34 mounted on holders, as presently described. The knife blade 33 has an interrupted concave arcuate cutting edge and the knife blade has a continuous concave arcuate cutting edge such that as a closure C is moved by the turret and the closure is rotated into the successive knife blades, the primary knife blade 33 produces a circumferential score in the sidewall of the closure leaving spaced connectors or bridges and the secondary knife blade 34 provides a continuous external score line and an accurately dimensional radial thickness of the bridges, as more fully discussed in the aforementioned copending application Ser. No. 08/048,638, filed Apr. 19, 1993, incorporated herein by reference. Each knife blade 33, 34 is in the form of a flat blade clamped in a knife blade holder 40 which is mounted on a linear machine slide 41 which is in turn mounted on the machine base 21 such that the linear slide 41 is radial to the rotation of a machine mounted turret (FIG. 6).

Referring to FIG. 2, each set of upper tooling 26 on the turret 23 includes a mandrel 43 with its axis parallel to the axis of rotation of the turret 26. Each mandrel 43 is rotated past an arcuate fixed gear 44 as the turret is rotated and a pinion gear 45 on each mandrel 43 meshes with fixed gear 44 to rotate the mandrel. A closure C is carried on each mandrel 43 and is brought successively into tangential contact with the blades 33, 34 such that scoring takes place in the side wall or skirt of the closure C to delineate the band.

The rotation of each closure C preferably is a substantially true rolling motion with each blade.

Each arcuate blade 33, 34 is designed such that at the desired depth of cut, the blade cutting edge is concentric to the turret center of rotation. A blade setting fixture enables the pre-setting of each arcuate blade 33, 34 in the holder such that when transferred to the machine mounting the arcuate blade will be aligned such that both the center of the radius of the arc of the arcuate blade and the midpoint of said arc lies on a radial line from the center of the turret parallel to the linear adjustment of the machine slide on which it is mounted. Thus, by linear adjustment of the machine slide, a position can be established whereby the blade arc is concentric to the center of rotation of the turret.

Each knife blade holder 40 includes knife blade holding plates 46*a*, 46*b* between which a knife blade 33 or 34 is clamped by headed screws 47. The knife blade has openings through which screws 47 extend. The plates and knife blades 23, 24 include clearance openings 48, 49, and located hole 50 in plate 46*b* for engaging dowels 51 on the dovetail slide 52 on the base 53 of the apparatus (FIGS. 3, 4).

Each knife blade 33, 34 and knife blade holder 40 is adjusted in a fixture 60 in a similar manner.

When in position on the machine, the radial depth of scoring of each knife blade can be controlled by rotating a knob 54 on the slide in visual guidance by a visual dial indicator 57. This construction comprises a screw 55 on which knob 54 is mounted. Screw 55 is journalled on slide 52 and engages a nut 56 fixed on base 100 of slide 41.

Referring to FIGS. 3, 4, 8–10, the blade setting fixture 60 includes a base 61, a pair of pilot holes 62 for the mounting of fixed cylindrical stops 63 in the form of rolls and a pair of cam shafts 64 supporting eccentric cams 65 connected to the shafts 64 by torque limiter knobs 66. The blade holder mounting includes a diamond shaped dowel 57 and a regular dowel 58 (to allow for pitch error) and cleaning screws 47 to replicate the machine mounting on the base. The fixed stops 63 are machined to preset dimensions for each particular blade profile/cap diameter combination, and selected and fitted accordingly.

For setting, a blade is secured snugly by screws but free to move within the holding plates 46*a*, 46*b* and the assembly is mounted onto the setting fixture 60. By carefully rotating the adjustment knobs 66, the blade is moved toward the fixed stops 63 until the blade cutting edge contacts the stops 63. By continuing the adjustment until the torque limiter knobs 66 slip, the final blade position is reached and the blade can be finally clamped between the holder plates 46*a*, 46*b*, by tightening screw 47.

The blade arc will change for differing closure diameters, and within a limited range it is possible by geometry to ensure that the fixed stops 63 are designed such that a particular "zero" position of the slide as indicated by the digital indicator on the slide, would be the correct position for the desired depth of cut. For closure diameters outside this range, it may be necessary to establish a different slide position for which the desired depth of cut would be theoretically correct in order that the blade projection from the blade holder is held to a practical minimum. However, due to variability in the parts, and the need to exactly control the depth of cut to ensure adequate band performance, it may be necessary to marginally deviate from this desired setting. The slide 52 provides this adjustment and as mentioned is equipped with a digital indicator to provide accurate feedback on the radial adjustment. The resulting minimal blade arc eccentricity to the turret center of rotation is negligible in practice.

Cams 70, 71 are provided for lifting and lowering the closure C on the lower tooling 27 into engagement with mandrel 43 by engaging rollers 72, 73, respectively, on the actuator 81 which supports the tooling support 80. A roller 77 on the tooling support 80 extends into a slot 78 on the turret 23 to guide the vertical movement of tooling support (FIGS. 2, 10–12).

Referring to FIG. 2, in accordance with another aspect of the invention, each set of lower tooling 27 comprises a block 80 fixed on a shaft 81 slidable in upper and lower linear ball bearings 82, 83 and with antirotation means comprising a cam roller 77 on the block 80 operating in slot 78 on the turret 23. Block 80 supports spring loaded closure support pad 84. In this manner, there is provided a large length to diameter ratio in bearings 82, 83 thereby providing substantial lateral support to the closure tooling support pad 80 and maintaining a compact configuration in the vertical axis. In addition, the tooling 27 is more readily accessible for changing the tooling.

It can thus be seen that there has been provided a method and apparatus utilizing successive arcuate cutting knives wherein each knife blade is accurately set utilizing a remote setting fixture; wherein the setting fixture does not require the use of a dial indicator and, therefore, is not affected by the variability of the dial indicator setting and needs less skill in use; wherein the setting fixture cannot be over adjusted; and wherein the adjustment is less dependent on operator skill.

I claim:

1. In a method of forming a circumferential score line on a tamper indicating plastic closure using a rotary apparatus having a center of rotation wherein the closure is moved in an arc having a radius of curvature about a center of rotation of the rotary apparatus past a scoring knife blade, the improvement comprising:

providing the knife blade having an arcuate concave cutting edge, the arcuate cutting edge defining an arc having a radius of curvature and center of rotation corresponding to the rotary apparatus;

positioning said knife blade in a knife blade holder having clamping means for clamping said knife blade on the knife blade holder;

providing first locating means on said rotary apparatus engageable with an associated second locating means on said knife blade holder;

providing a fixture having a third locating means for locating the knife blade holder on said fixture by engagement with the second locating means;

removing said knife blade holder with the knife blade from the rotary apparatus and positioning said knife blade holder with the knife blade on said fixture;

loosening said clamping means on said knife holder;

providing stop means having a plurality of spaced stops on said fixture, said spaced stops defining the arc of the rotary apparatus for engagement with the arcuate cutting edge of said knife blade;

positioning said spaced stops on the fixture such that when the arcuate cutting edge engages said spaced stops it is positioned in a predetermined position relative to the knife blade holder;

moving said knife blade relative to said knife blade holder against said stop means with a predetermined force by engaging the opposite edge of the knife blade at spaced points and applying the predetermined force at each of the spaced points to urge said arcuate cutting edge of said knife blade against said spaced stops;

limiting the predetermined force to a predetermined value;

tightening said clamping means to clamp said knife blade relative to said holder;

removing the knife blade holder with the knife blade from said fixture, and repositioning said knife blade holder with the knife blade on said rotary apparatus by engaging said first locating means and said second locating means such that the arcuate cutting edge of said cutting blade is accurately positioned (1) at a predetermined depth for scoring the closures and (2) parallel to the arc formed by the moving closures, and further wherein a radius of curvature formed by the arcuate cutting blade substantially corresponds with the center of rotation of the rotary apparatus.

2. The method set forth in claim 1 wherein said step of moving said knife blade comprises providing eccentric cams at said spaced points and rotating said cams to apply said force.

3. The method set forth in claim 1 wherein said step of limiting the force applied to said knife blade comprises positioning torque limiting means in said eccentric cams.

4. In an apparatus for forming a circumferential score line on a tamper indicating plastic closure using a rotary apparatus wherein the closure is moved in an arc having a radius of curvature about a center of rotation of the rotary apparatus past a scoring knife blade, the improvement comprising:

a knife blade holder for the knife blade, the knife blade having an arcuate concave cutting edge defining an arc having a radius of curvature and center of rotation corresponding to the rotary apparatus, said knife blade holder having clamping means for clamping said knife blade on the holder;

first locating means on said rotary apparatus engageable with an associated second locating means on said knife blade holder;

a fixture having a third locating means for locating said knife blade holder and knife blade on said fixture by engagement with said second locating means;

stop means on said fixture comprising a plurality of spaced stops, said spaced stops defining the arc of the rotary apparatus for engagement with the arcuate cutting edge of said knife blade, wherein said spaced stops being positioned on the fixture such that when the arcuate cutting edge engages said spaced stops it is positioned in a predetermined position relative to the knife blade holder;

means on said fixture for engaging said knife blade at spaced points along an opposite edge of said knife blade and moving said knife blade relative to said knife blade holder against said spaced stops;

means for applying a predetermined force to said knife blade at said spaced points;

means for limiting the predetermined force applied to said knife blade to a predetermined value; and, wherein said clamping means can be tightened to clamp said knife blade relative to said knife blade holder and said knife blade holder and knife blade can be removed from said fixture and repositioning on said rotary apparatus by engaging said first locating means and said second locating means such that the arcuate cutting edge of said cutting blade is accurately positioned (1) at a predetermined depth for scoring the closures and (2) parallel to the arc formed by the moving closures, and further wherein a radius of curvature formed by the arcuate cutting blade substantially corresponds with the center of rotation of the rotary apparatus.

5. The apparatus set forth in claim 4 wherein said first locating means, knife blade holder and said fixture comprise complementary dowels and openings.

6. The apparatus set forth in claim 4 wherein said rotary apparatus comprises a plurality of mandrels for holding a plurality of closures, a plurality of support pads on which said closures are supported, each support pad being provided on a block, a shaft on which said block is mounted, spaced linear bearings for supporting said shaft for vertical linear movement.

7. The apparatus set forth in any one of claims 4, 5, and 6 including a slide on said rotary apparatus supporting said knife blade holder for fine radial adjustment.

8. The apparatus set forth in claim 4 wherein said means for moving said knife blade against said spaced stops comprises eccentric cams at said spaced points.

9. The apparatus set forth in claim 8 wherein said means for limiting the force applied to said knife blade comprises torque limiting means in each said eccentric cam.

* * * * *

UNITED STATES PATENT AND TRADEMARK OFFICE
CERTIFICATE OF CORRECTION

PATENT NO. : 5,522,293

DATED : June 4, 1996

INVENTOR(S) : Keith W. Ingram

Figure 9:
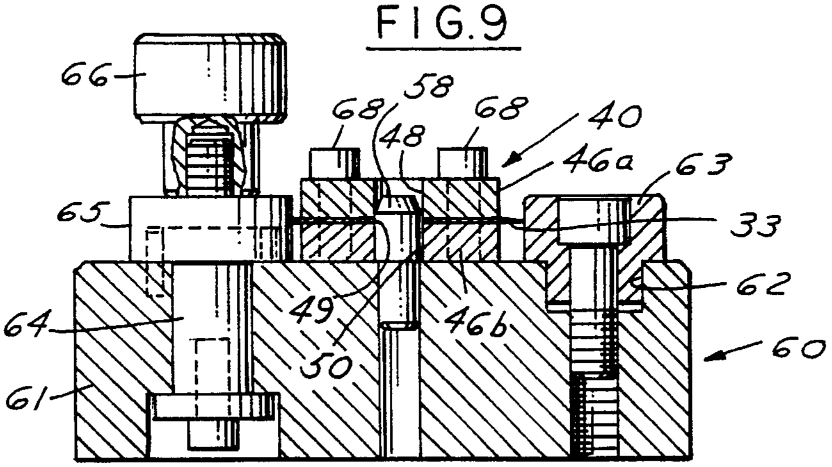
FIG. 9 is a sectional view taken along the line 9—9 in FIG. 8.
Figure 11:
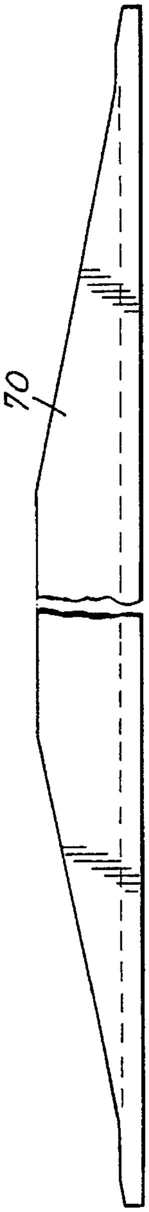
FIG. 11 is a fragmentary elevational view of a portion of the cams on the apparatus.
Figure 12:
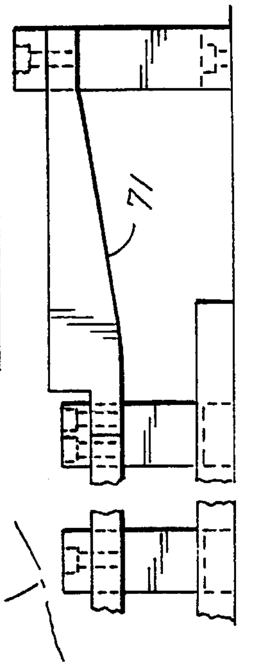
FIG. 12 is a fragmentary plan view of a portion of the apparatus.
Figure 10:
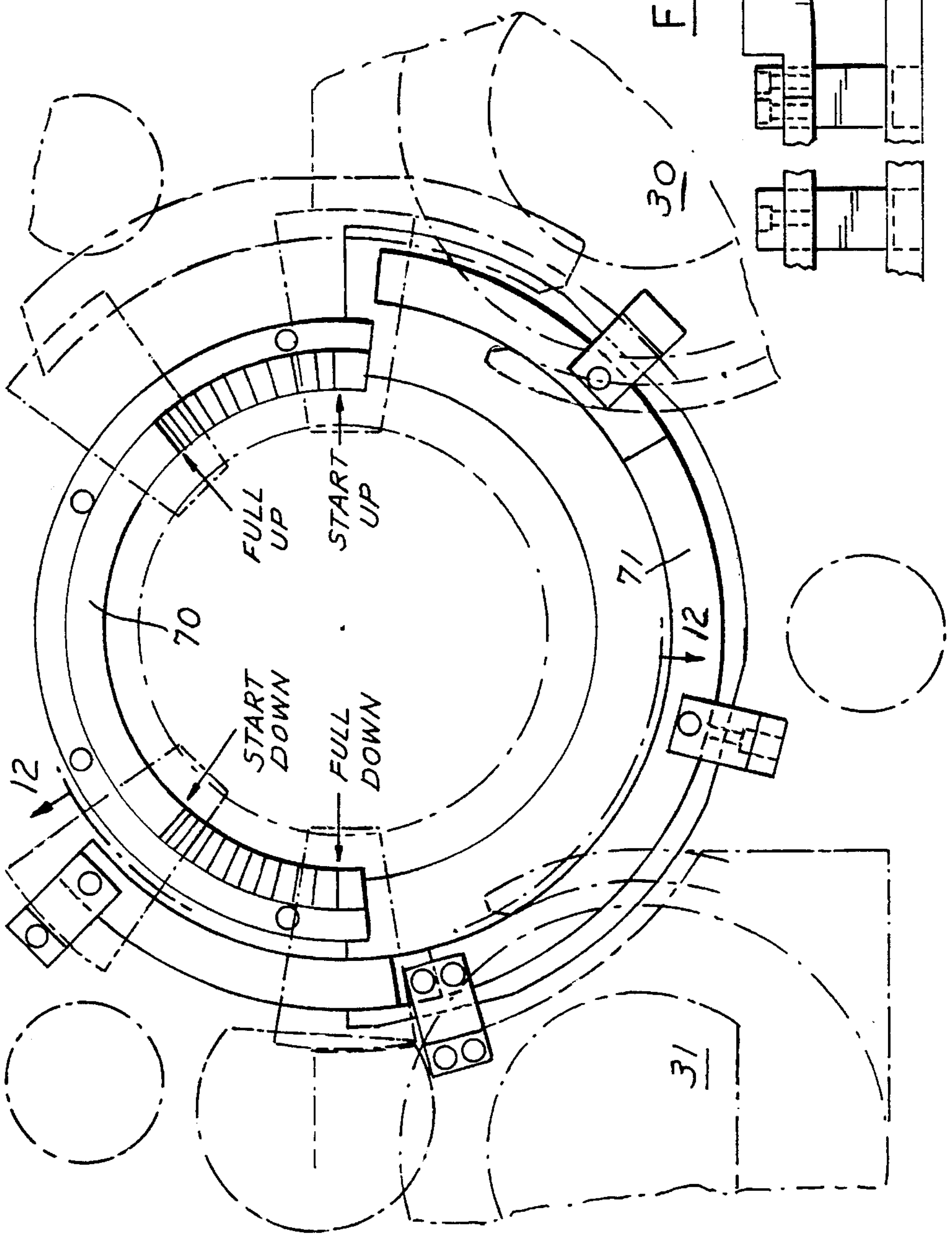
FIG. 10 is a partly diagrammatic view of the apparatus cams utilized in the rotary apparatus for moving the closures into each of the knife blades and raising and lowering the tooling as the apparatus rotates.
Figure 3:
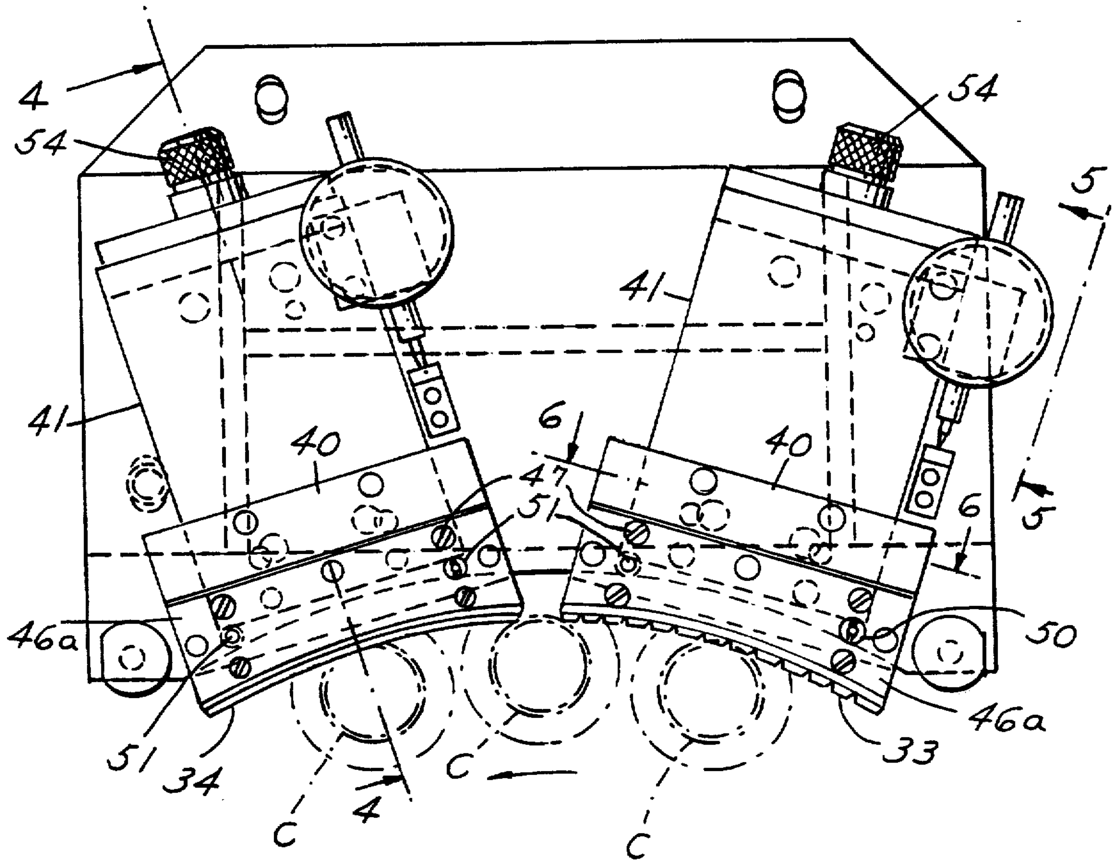
Figure 4:
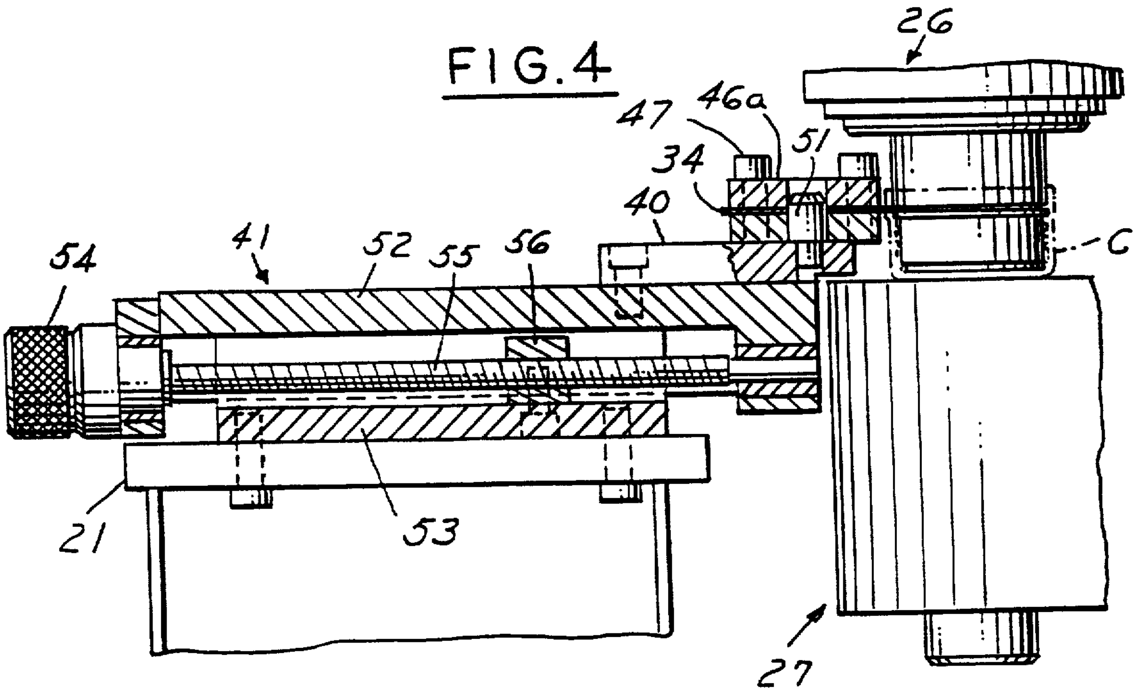
Figure 9:
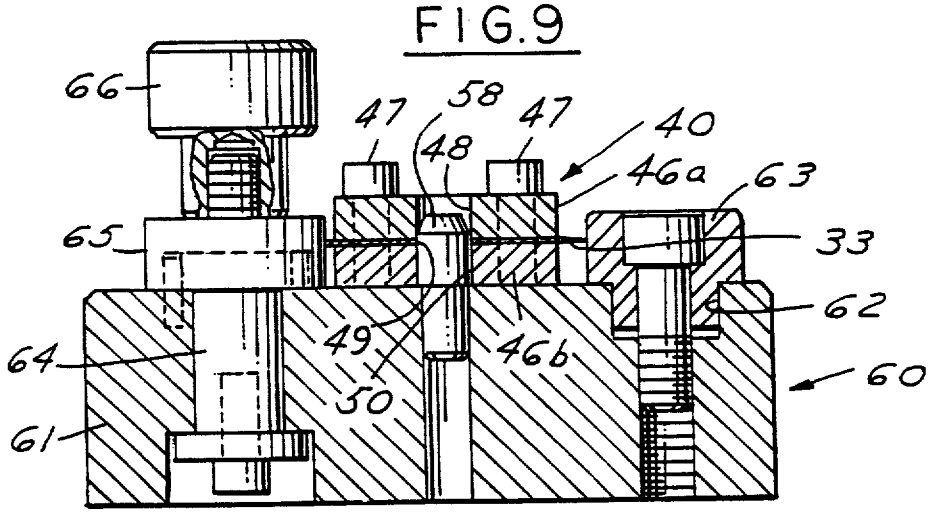

It is certified that error appears in the above-indentified patent and that said Letters Patent is hereby corrected as shown below:

In the drawings, delete FIGS. 3, 4 and 9 and replace with FIGS. 3, 4 and 9 attached hereto Column 4, line 29, "100" should be --53--

Column 5, lines 15-16, "substantial" should be deleted; "tooling" should be deleted; and "80" should be --84--

Signed and Sealed this

Second Day of September, 1997

Attest:

BRUCE LEHMAN

*Attesting Officer*

*Commissioner of Patents and Trademarks*